US012741606B2

(12) United States Patent
Yabu

(10) Patent No.: US 12,741,606 B2
(45) Date of Patent: Sep. 22, 2026

(54) BUMPER IMPACT PRESSURE SENSOR

(71) Applicant: Honda Motor Co., Ltd., Tokyo (JP)

(72) Inventor: Tomoya Yabu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 193 days.

(21) Appl. No.: 18/468,739

(22) Filed: Sep. 18, 2023

(65) Prior Publication Data

US 2024/0092297 A1 Mar. 21, 2024

(30) Foreign Application Priority Data

Sep. 20, 2022 (CN) ......................... 202211144838.9

(51) Int. Cl.
*B60R 19/48* (2006.01)
*G01L 1/26* (2006.01)
*G01L 5/00* (2006.01)

(52) U.S. Cl.
CPC ............ *B60R 19/48* (2013.01); *B60R 19/483* (2013.01); *G01L 1/26* (2013.01); *G01L 5/0052* (2013.01)

(58) Field of Classification Search
CPC ......... B60R 19/48; B60R 19/483; G01L 1/26; G01L 5/0052
USPC ...................................................... 73/862.541
See application file for complete search history.

(56) References Cited

U.S. PATENT DOCUMENTS

| | | | | |
|---|---|---|---|---|
| 2015/0283639 A1 | 10/2015 | Henry et al. | | |
| 2016/0039376 A1* | 2/2016 | Narita | B60R 19/18 | 293/4 |
| 2016/0039378 A1* | 2/2016 | Foo | B60R 21/0136 | 701/45 |
| 2016/0101753 A1* | 4/2016 | Higashimachi | B60R 21/0136 | 293/117 |
| 2017/0225637 A1* | 8/2017 | Kamimura | B62D 29/008 | |
| 2018/0079381 A1* | 3/2018 | Nakane | B60R 19/483 | |
| 2019/0023206 A1* | 1/2019 | Yoshida | B60R 21/0136 | |
| 2020/0223384 A1* | 7/2020 | Kim | B60R 19/483 | |
| 2021/0094495 A1* | 4/2021 | Park | B60R 21/0136 | |

FOREIGN PATENT DOCUMENTS

| | | | |
|---|---|---|---|
| CN | 108698549 | 10/2018 | |
| EP | 3403887 | 8/2022 | |
| JP | 2015150906 | 8/2015 | |
| JP | 2015150906 A * | 8/2015 | B60R 19/18 |
| JP | 2018167695 A * | 11/2018 | |
| JP | 7037983 B2 * | 3/2022 | |
| WO | WO-2017122598 A1 * | 7/2017 | B60R 19/023 |

OTHER PUBLICATIONS

"First Office Action of China Counterpart Application", with English translation thereof, issued on Apr. 30, 2026, pp. 1-10.

* cited by examiner

*Primary Examiner* — Peter J Macchiarolo
*Assistant Examiner* — Monica S Young
(74) *Attorney, Agent, or Firm* — JCIPRNET

(57) ABSTRACT

A sensor arrangement structure that makes a sensor tube easy to arrange is disclosed. The sensor arrangement structure includes a bumper beam; a shock absorber disposed in front of the bumper beam and having a groove; and a contact sensor including a sensor tube, in which the sensor tube is disposed between the bumper beam and the shock absorber, the groove is configured to arrange the sensor tube, the groove includes an expansion groove portion, and the expansion groove portion has a width greater than a width of a rest part of the groove.

3 Claims, 6 Drawing Sheets

BUMPER IMPACT PRESSURE SENSOR

CROSS-REFERENCE TO RELATED APPLICATION

This application claims the priority benefit of China application serial no. 202211144838.9, filed on Sep. 20, 2022. The entirety of the above-mentioned patent application is hereby incorporated by reference herein and made a part of this specification.

BACKGROUND

Technical Field

This disclosure relates to a partial structure of a vehicle body, in particular to a sensor arrangement structure.

Description of Related Art

In recent years, efforts to provide access to sustainable transportation systems that also take into account the vulnerable position of people such as the elderly or children among traffic participants are becoming active. In order to achieve the stated purpose, research and development related to crash safety performance has been devoted to further improving the safety or convenience of transportation. In the development related to crash safety performance, a sensor tube installed between the bumper beam and the shock absorber is used to sense the impact force of the vehicle against an object (such as a pedestrian) at the shock absorber as a basis for safe driving control of the vehicle. However, the sensor tube may not embed into the groove of the shock absorber due to its length error, making it more difficult to assemble. Thus, it is necessary to improve the design of the sensor arrangement structure to overcome the described problem.

SUMMARY

The disclosure provides a sensor arrangement structure that makes a sensor tube easy to arrange.

The disclosure provides a sensor arrangement structure including a bumper beam; a shock absorber disposed in front of the bumper beam and having a groove; and a contact sensor including a sensor tube, in which the sensor tube is disposed between the bumper beam and the shock absorber, the groove is configured to arrange the sensor tube, the groove includes an expansion groove portion, and the expansion groove portion has a width greater than a width of a rest part of the groove.

In an embodiment of the disclosure, the expansion groove portion is located outside an end of the bumper beam.

In an embodiment of the disclosure, the sensor tube is bent in an upward and downward direction of a vehicle at a position outside the end of the bumper beam, and the expansion groove portion is located at the position.

In an embodiment of the disclosure, the expansion groove portion expands only in a cross-sectional direction of the shock absorber.

In an embodiment of the disclosure, the sensor arrangement structure further includes a sensor cover, the sensor cover covers the shock absorber and the sensor tube on the shock absorber from a rear surface of the shock absorber, the sensor cover has a protrusion, and the protrusion has dimensions correspond to the expansion groove portion.

Based on the above, in the sensor arrangement structure of the disclosure, the groove of the shock absorber includes the expansion groove portion with a large width to absorb a length error of the sensor tube, so that the sensor tube will not be difficult to embed into the groove of the shock absorber due to the length error of the sensor tube. Thus, the sensor arrangement structure of the disclosure may make the sensor tube easy to arrange.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
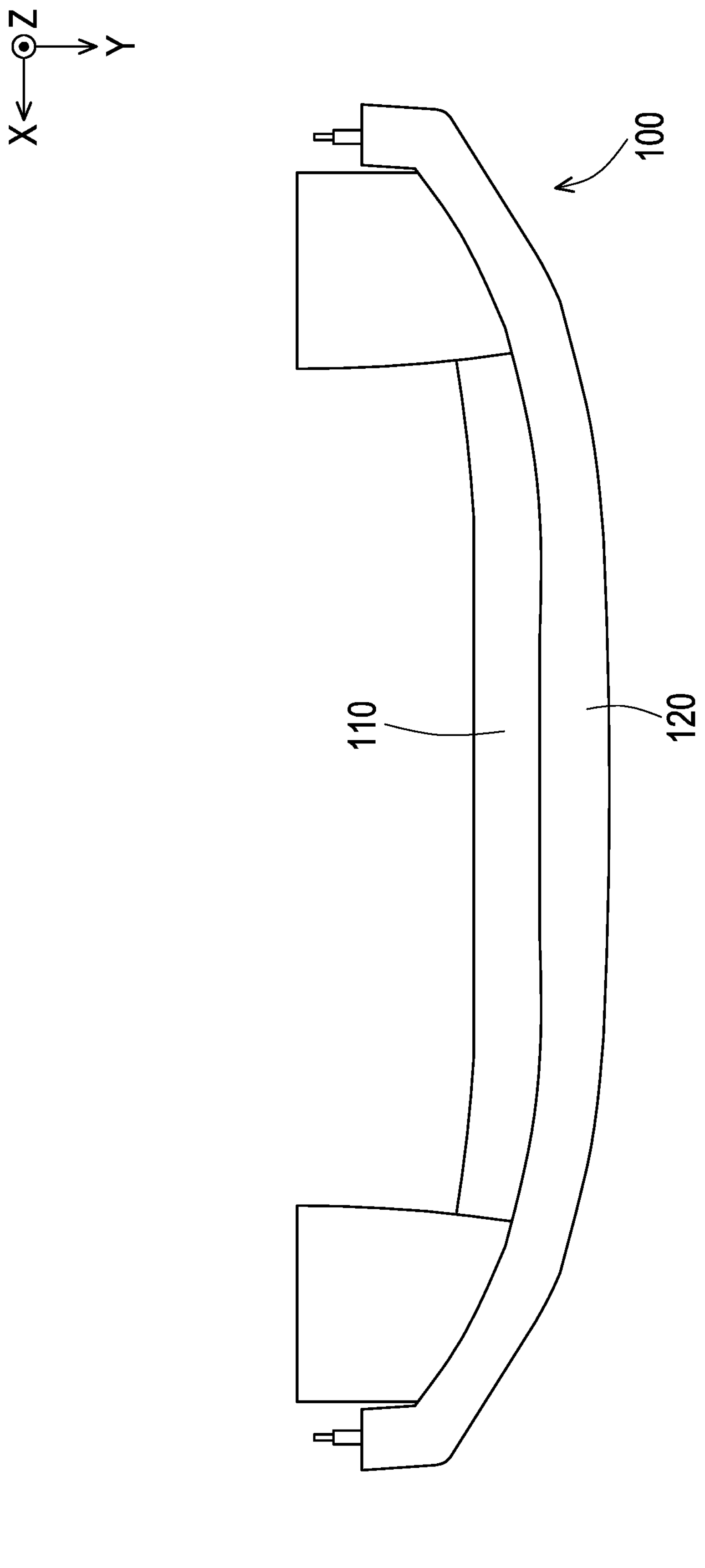
FIG. 1 is a schematic top view of a sensor arrangement structure according to an embodiment of the disclosure.
Figure 2:
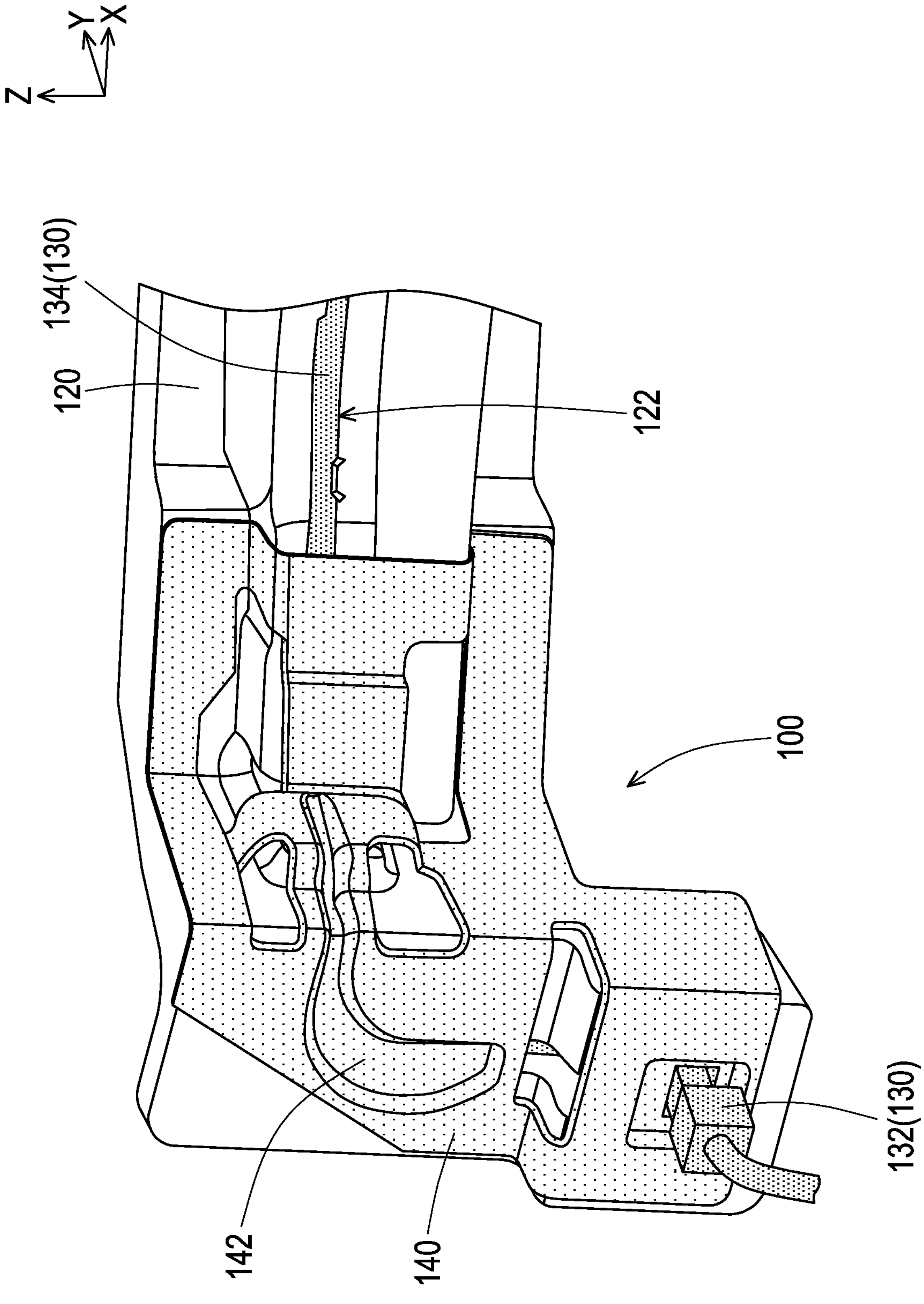
FIG. 2 is a partial perspective view of the sensor arrangement structure in FIG. 1.
Figure 3:
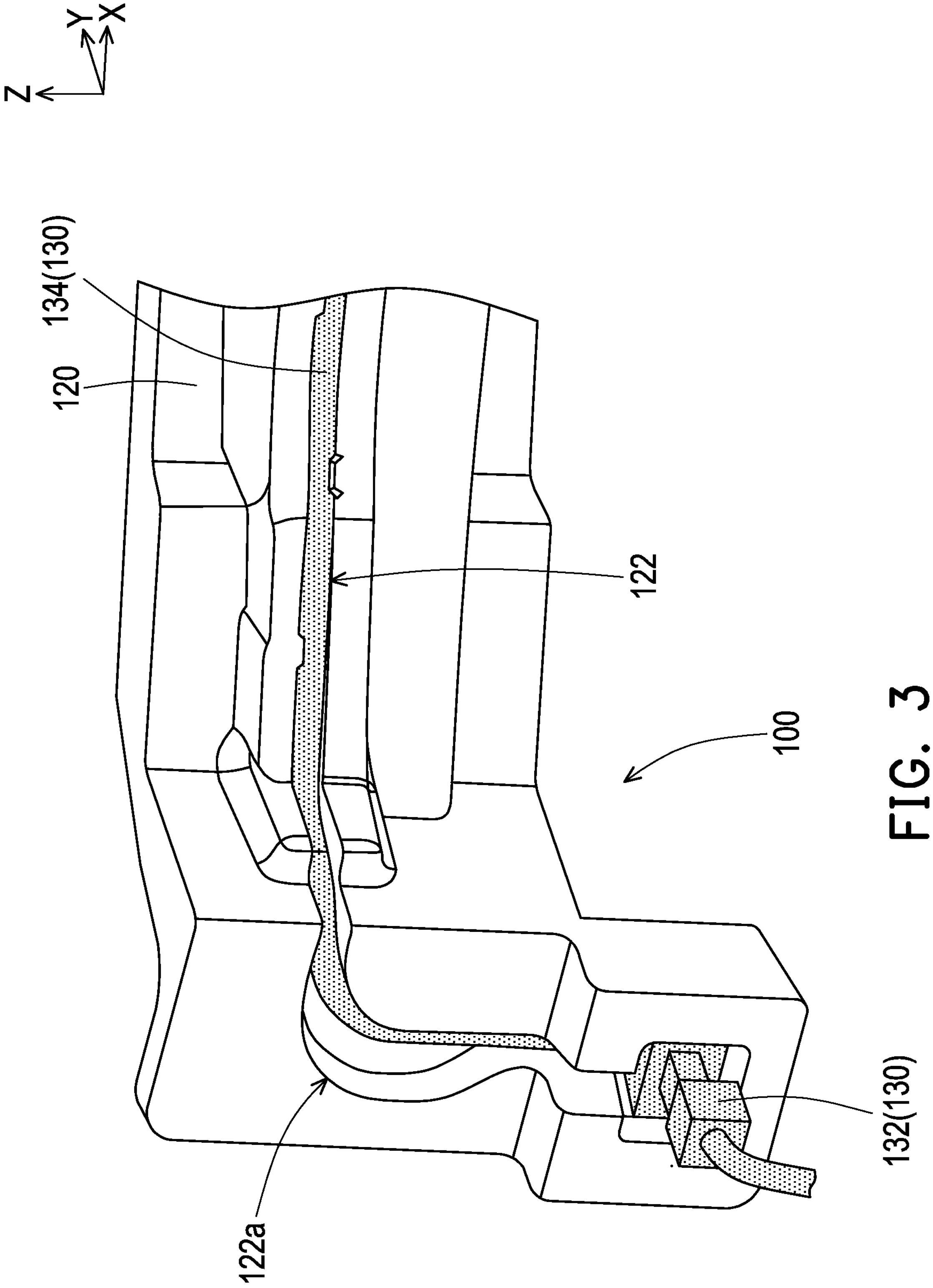
FIG. 3 is a perspective view of some components of the sensor arrangement structure of FIG. 2.

FIG. 1 is a schematic top view of a sensor arrangement structure according to an embodiment of the disclosure, in which axes X, Y, and Z are drawn. FIG. 2 is a partial perspective view of the sensor arrangement structure in FIG. 1. FIG. 3 is a perspective view of some components of the sensor arrangement structure of FIG. 2. Referring to FIG. 1 to FIG. 3, a sensor arrangement structure 100 of this embodiment includes a bumper beam 110, a shock absorber 120, a contact sensor 130, and a sensor cover 140. The bumper beam 110 is, for example, a front bumper beam of a vehicle, and the shock absorber 120 is, for example, a foam material and is disposed in front of the bumper beam 110 in a forward and backward direction of a vehicle (i.e., a direction parallel to the axis Y) to provide a cushioning effect in the event of an impact.

The contact sensor 130 is fixed on the shock absorber 120 and includes a sensor body 132 and a sensor tube 134. The sensor tube 134 is disposed between the bumper beam 110 and the shock absorber 120 and connected to the sensor body 132. The sensor cover 140 is screw-locked or otherwise suitably assembled to the shock absorber 120 while covering the shock absorber 120 and the sensor tube 134 on the shock absorber 120 from a rear surface of the shock absorber 120, and the contact sensor 130 is sandwiched between the sensor cover 140 and the shock absorber 120. The shock absorber 120 has a groove 122 for arranging the sensor tube 134. When the vehicle is subjected to an impact force at the shock absorber 120, the impact force is transmitted to the sensor tube 134 and causes the pressure in the sensor tube 134 to change. The sensor body 132 senses the pressure change in the sensor tube 134 to determine the impact force applied to the vehicle at the shock absorber 120.

Figure 4:
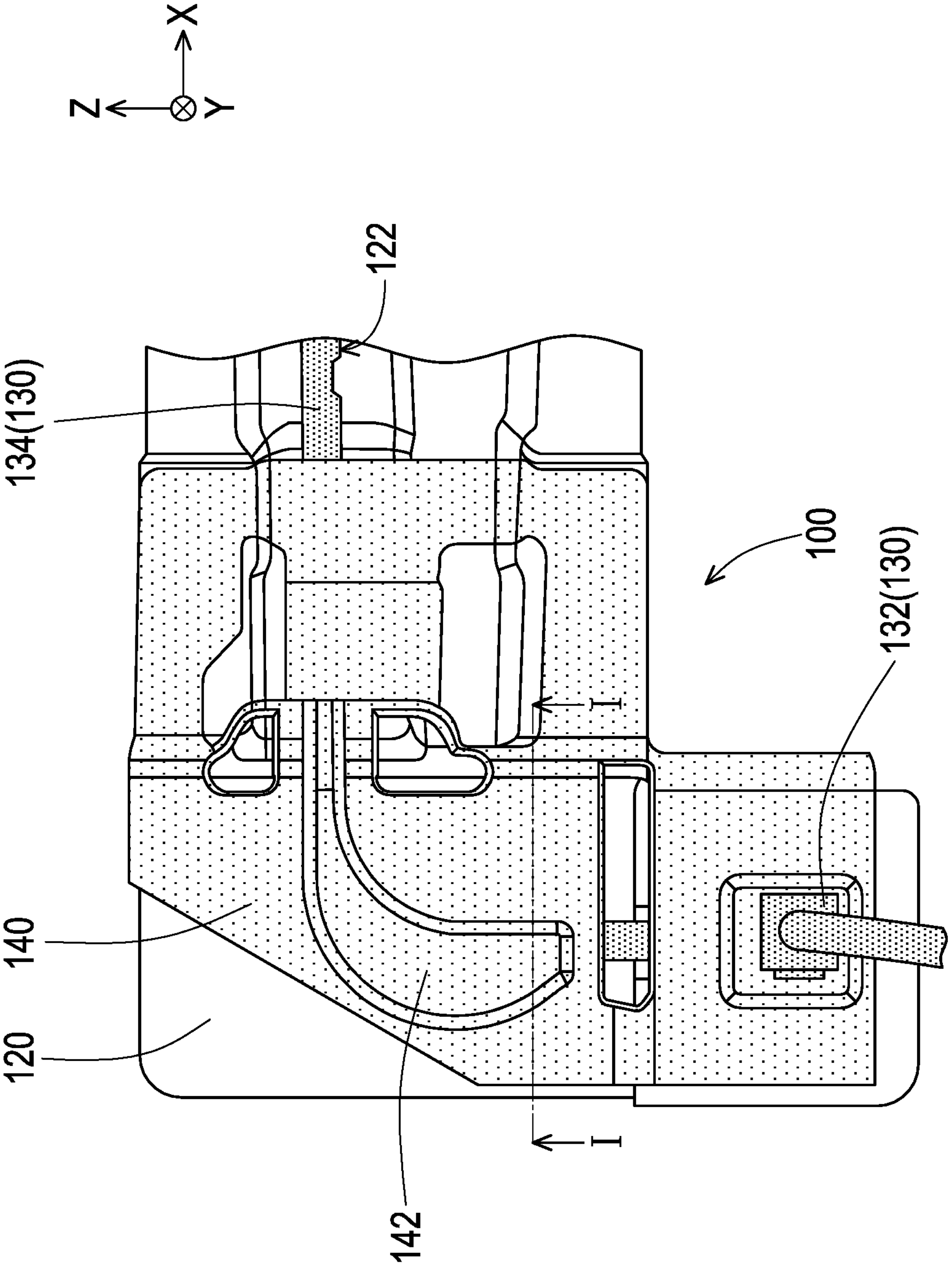
FIG. 4 is a partial rear view of the sensor arrangement structure in FIG. 2.
Figure 5:
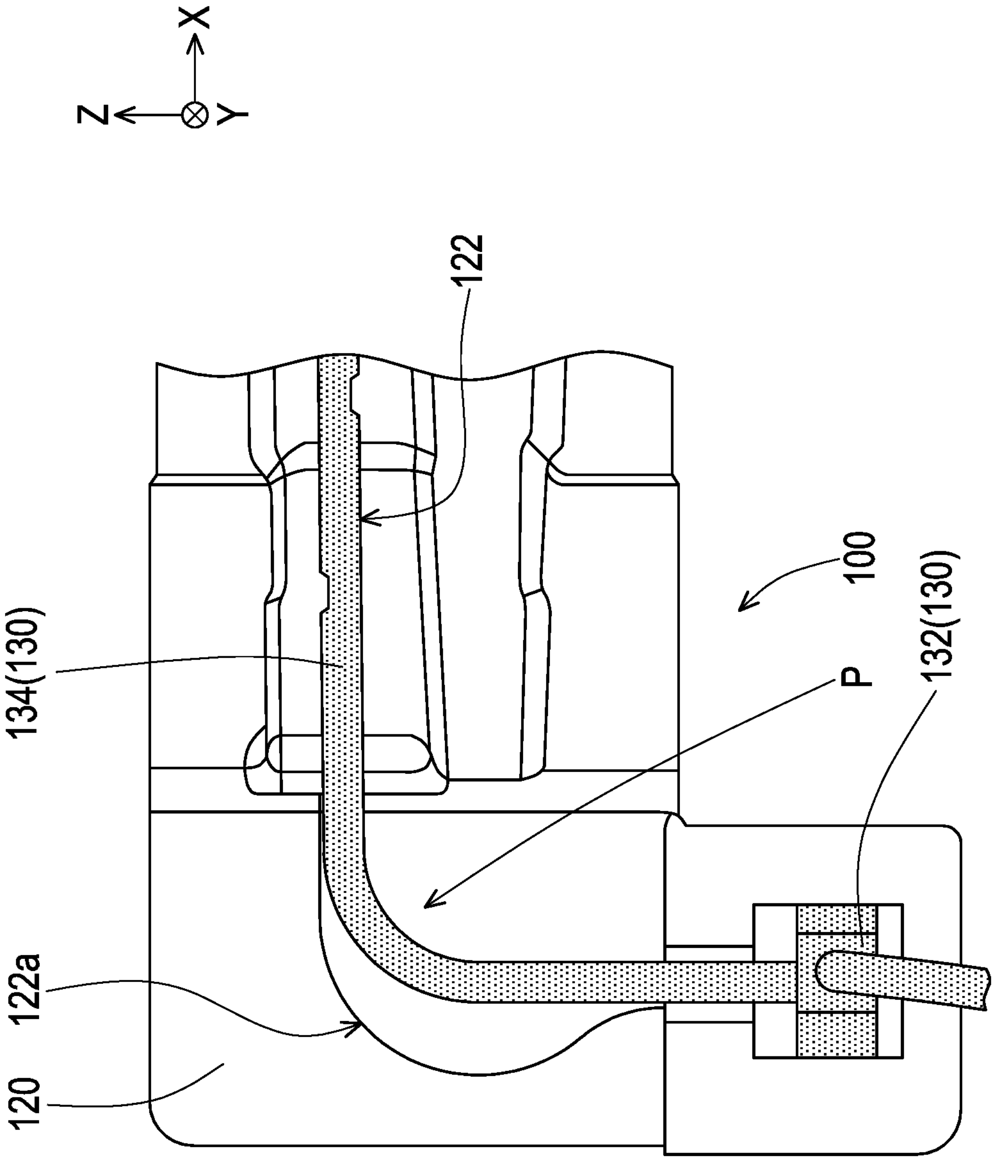
FIG. 5 is a partial rear view of the sensor arrangement structure in FIG. 3.

FIG. 4 is a partial rear view of the sensor arrangement structure in FIG. 2. FIG. 5 is a partial rear view of the sensor arrangement structure in FIG. 3. Referring to FIG. 4 and FIG. 5, in this embodiment, the groove 122 of the shock absorber 120 includes an expansion groove portion 122*a*, the expansion groove portion 122*a* has a width greater than a width of a rest part of the groove 122. The expansion groove portion 122*a* may absorb a length error of the sensor tube 134, so that the sensor tube 134 will not be difficult to embed into the groove 122 of the shock absorber 120 due to the length error of the sensor tube 134. Thus, the sensor arrangement structure 100 of this embodiment may make the sensor tube 134 easy to arrange.

Specifically, the sensor tube 134 of this embodiment extends in a direction of a width of the vehicle (i.e., a direction parallel to the axial direction X) within a range of the bumper beam 110 (shown in FIG. 1), and is bent downwards in an upward and downward direction of the vehicle (i.e. a direction parallel to the axial direction Z) at a position P (marked in FIG. 5) outside an end of the bumper beam 110 in the direction of the width of the vehicle (i.e., the direction parallel to the axial direction X). Accordingly, the expansion groove portion 122*a* of the groove 122 is disposed at the position P outside the end of the bumper beam 110 in the direction of the width of the vehicle (i.e., the direction parallel to the axial direction X), so that the sensor tube 134 follows a curved profile of the expansion groove portion 122*a*, and the sensor tube 134 may be moderately displaced to absorb the length error of the sensor tube 134 by a large displacement space in the expansion groove 122*a*

Since the sensor tube 134 has a large displacement space in the expansion groove portion 122*a*, which may affect sensing accuracy of the sensor tube 134 at the expansion groove portion 122*a*, in this embodiment, the expansion groove portion 122*a* of the groove 122 is disposed outside the end of the bumper beam 110 as described above, so that the expansion groove portion 122*a* will not affect the sensing accuracy of the sensor tube 134 within the range of the bumper beam 110. In addition, in this embodiment, the expansion groove portion 122*a* of the groove 122 is disposed at a bending position (i.e., position P) of the sensor tube 134 as described above, so that an existing bending section of the sensor tube 134 may be moderately displaced and extended in the expansion groove portion 122*a* with a large displacement space to achieve the effect of absorbing the length error of the sensor tube 134. Compared with providing the expansion groove portion in the horizontal extension of the sensor tube 134 and making the sensor tube 134 bend in its horizontal extension, in this embodiment, the expansion groove portion 122*a* is disposed in the existing bending section of the sensor tube 134, which can make the assembly of the sensor tube 134 smoother.

In this embodiment, the expansion groove portion 122*a* of the groove 122 only expands in a cross-sectional direction of the shock absorber 120 (i.e., a direction perpendicular to the axis Y), and not in a depth direction of the groove 122 (i.e., the direction parallel to the axis Y). Accordingly, the sensor tube 134 does not have displacement in the depth direction of the groove 122, and thus the displacement of the sensor tube 134 in the depth direction that causes a distance between the sensor tube 134 and the bumper beam 110 (shown in FIG. 1) to change may be avoided, whereby a good sensing accuracy of the sensor tube 134 is ensured.

Figure 6:
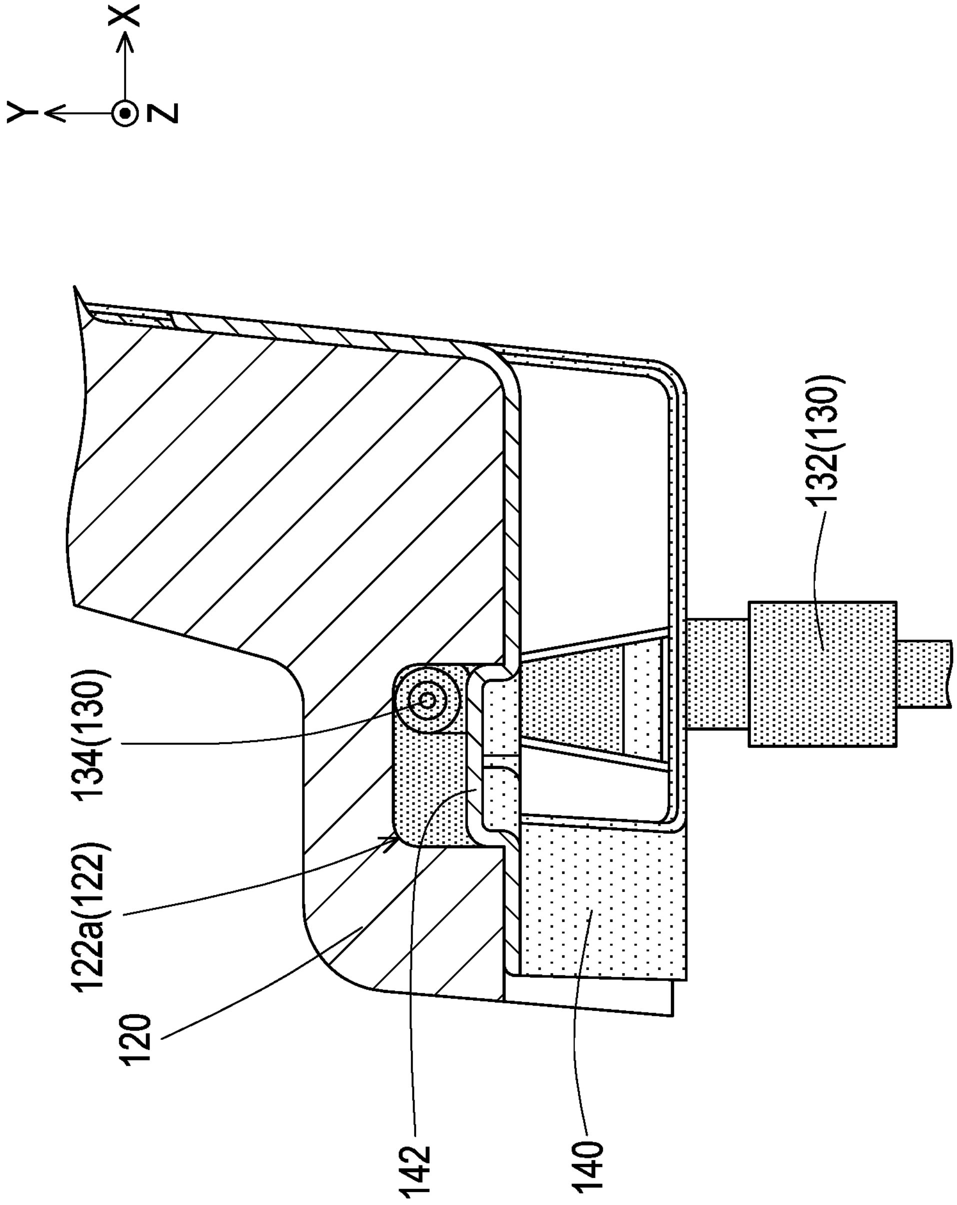
FIG. 6 is a cross-sectional view of the sensor arrangement structure in FIG. 4 along line I-I.

FIG. 6 is a cross-sectional view of the sensor arrangement structure in FIG. 4 along line I-I. Referring to FIG. 2, FIG. 4, and FIG. 6, in this embodiment, the sensor cover 140 has a protrusion 142, and the protrusion 142 has dimensions correspond to the expansion groove portion 122*a*. The protrusion 142 is embedded in the expansion groove portion 122*a* by protruding in the depth direction (i.e., the direction parallel to the axis Y) of the groove 122. Accordingly, during the assembly of the sensor cover 140, the protrusion 142 may serve as a positioning function and make the sensor cover 140 easy to assemble.

To sum up, in the sensor arrangement structure of the disclosure, the groove of the shock absorber includes the expansion groove portion with a large width to absorb a length error of the sensor tube, so that the sensor tube will not be difficult to embed into the groove of the shock absorber due to the length error of the sensor tube. Thus, the sensor arrangement structure of the disclosure may make the sensor tube easy to arrange.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A sensor arrangement structure comprising:
- a bumper beam;
- a shock absorber disposed in front of the bumper beam and having a groove; and
- a pressure sensor comprising a sensor tube, wherein the sensor tube is disposed between the bumper beam and the shock absorber, and the groove is configured to arrange the sensor tube,
- the groove comprising an expansion groove portion, the expansion groove portion having a width greater than a width of a rest part of the groove,
- wherein a part of the shock absorber extends to outside an end of the bumper beam in a direction of a width of a vehicle, and the expansion groove portion is located on the part of the shock absorber and outside an end of the bumper beam in the direction of the width of the vehicle,
- wherein the sensor arrangement structure further comprises a sensor cover, the sensor cover covers the shock absorber and the sensor tube on the shock absorber from a rear surface of the shock absorber, the sensor cover has a protrusion, and the protrusion has dimensions correspond to the expansion groove portion,
- wherein the bumper beam extends in the direction of the width of the vehicle, and the protrusion extends toward the sensor tube in a depth direction of the groove perpendicular to the direction of the width of the vehicle.

2. The sensor arrangement structure according to claim 1, wherein
- the sensor tube is bent in an upward and downward direction of the vehicle at a position outside the end of the bumper beam in the direction of the width of the vehicle to be connected to a sensor body, and the expansion groove portion is located at the position.

3. The sensor arrangement structure according to claim 1, wherein
- the expansion groove portion expands only in a cross-sectional direction of the shock absorber.

* * * * *